UNITED STATES PATENT OFFICE.

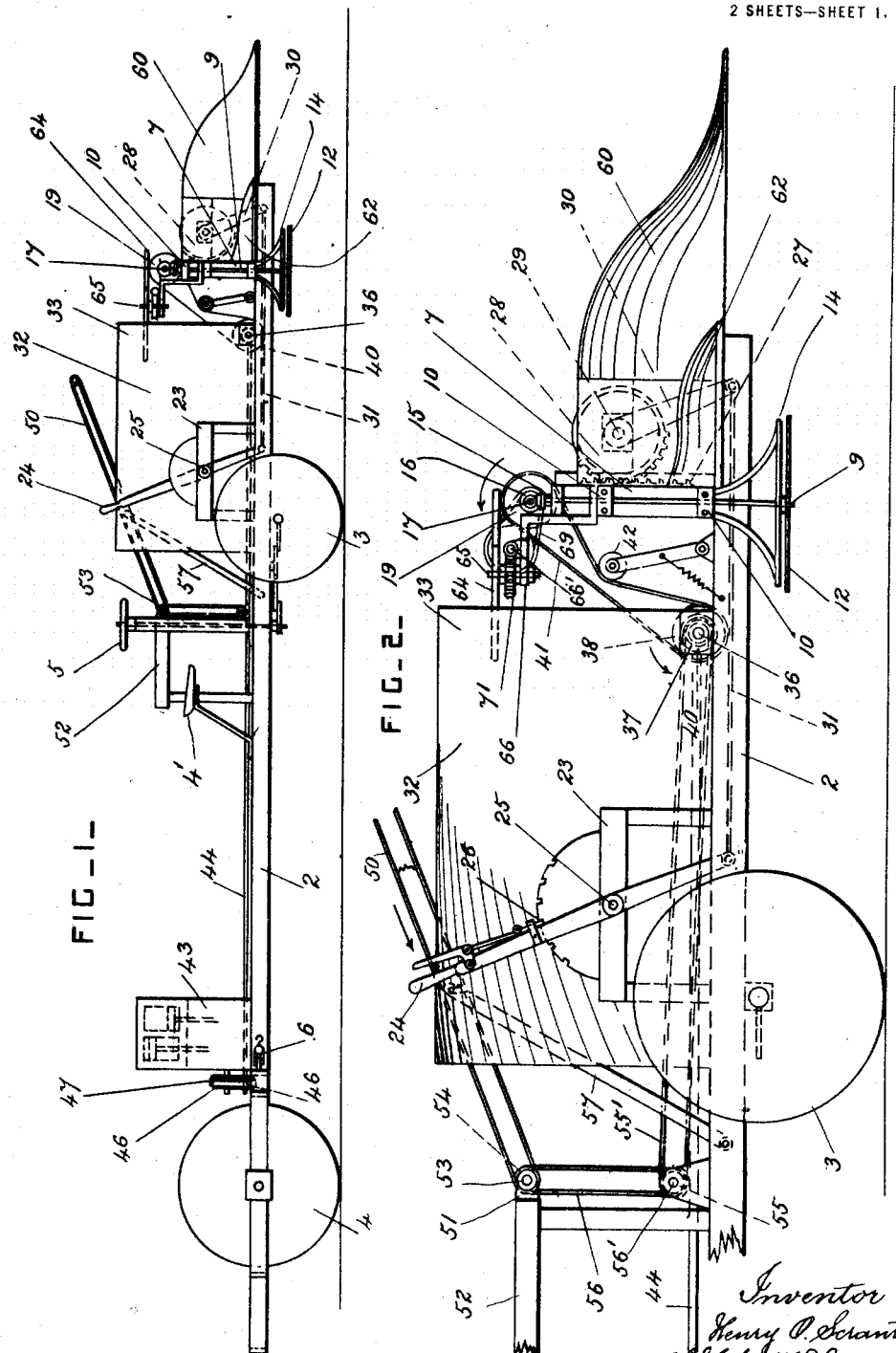

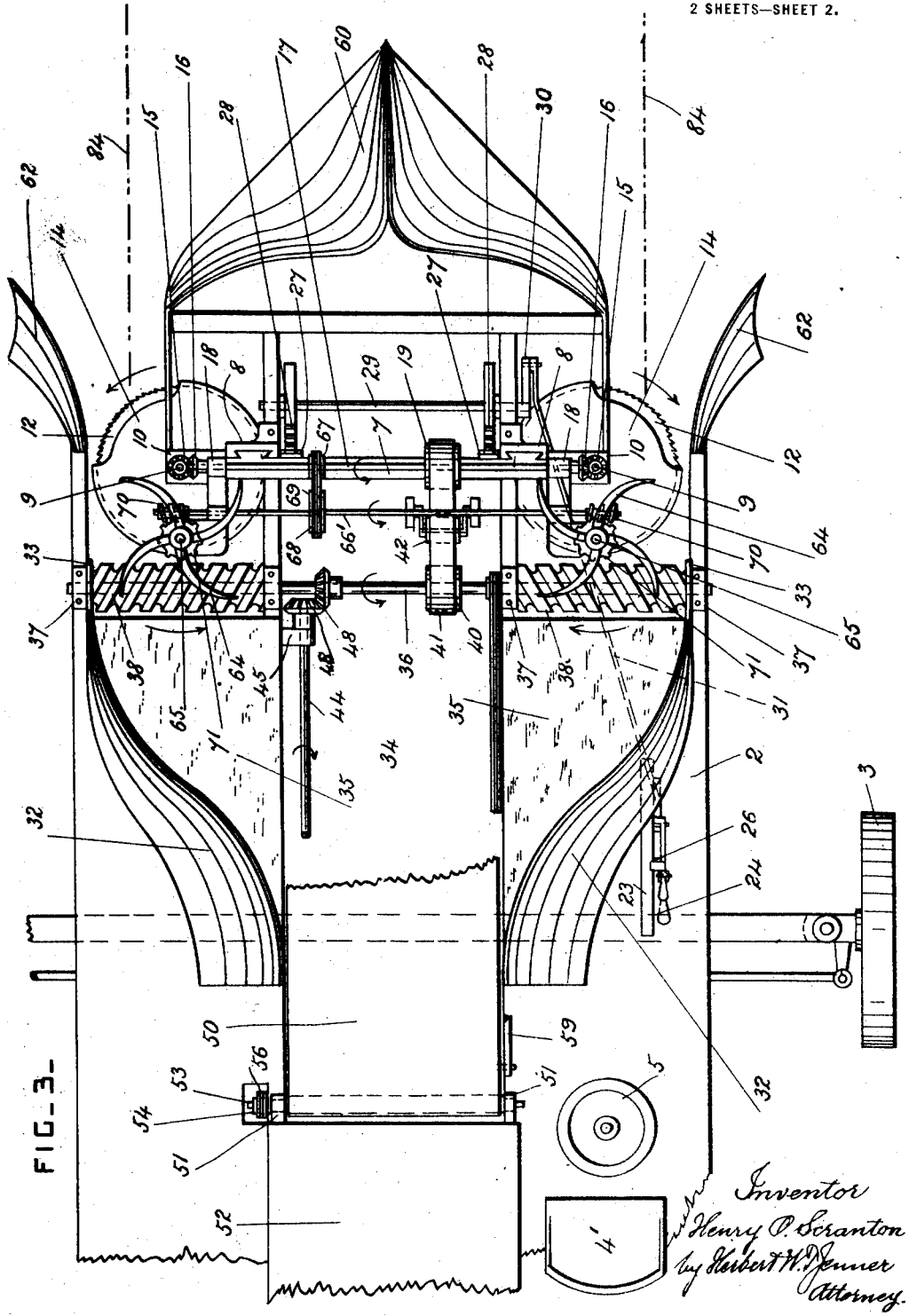

HENRY OSBERT SCRANTON, OF JEANERETTE, LOUISIANA.

CANE HARVESTING AND WINDROWING MACHINE.

1,365,955. Specification of Letters Patent. Patented Jan. 18, 1921.

Application filed September 16, 1919. Serial No. 324,081.

*To all whom it may concern:*

Be it known that I, HENRY O. SCRANTON, a citizen of the United States, residing at Jeanerette, in the parish of Iberia and State of Louisiana, have invented certain new and useful Improvements in Cane Harvesting and Windrowing Machines, of which the following is a specification.

This invention relates to machines specially adapted for harvesting and windrowing sugar canes and other similar crops; and it consists in the novel construction and combination of the parts, hereinafter fully described and claimed, whereby the canes are cut down and are deposited centrally and longitudinally on the line of draft of the machine between the rows of plants.

In the drawings, Figure 1 is a side view showing an outline of the machine. Fig. 2 is also a side view showing the principal parts of the machine more fully, and is drawn to a larger scale. Fig. 3 is a plan view of the parts shown in Fig. 2.

A truck 2 is provided, and is mounted on front ground wheels 3 and rear ground wheels 4, but may be mounted on runners, if desired. The front wheels 3 are the steering wheels, and they are operated by any suitable mechanism by the driver or operator, from a seat 4' arranged to the rear of the steering wheels at one side of the machine, and having the steering hand wheel 5 arranged in front of it.

The propulsion of the machine is preferably effected by mules, and draft attachments 6 are connected to the truck in front of the rear wheels at each side of the machine, so that the animals are arranged between the front and rear ground wheels, leaving the front end of the truck wholly unobstructed. A motor may however be used for propelling the machine, instead of mules, and it may be arranged in any approved way that will leave the front end of the machine unobstructed.

The cutting mechanism is carried by a frame 7 which is slidable in guides 8 arranged vertically and at the front portion of the truck.

Two vertical cutter shafts 9 are provided, and are journaled in bearings 10 on the frame 7, and are arranged one at each side of the machine. Saws 12, or similar circular cutters, are secured on the lower end portions of the shafts 9, and have stationary saw guards 14 secured to the frame 7 and arranged above them.

Beveled toothed wheels 15 are secured on the upper end portions of the shafts 9, and gear into beveled toothed wheels 16 secured on a horizontal shaft 17 journaled in bearings 18 on the frame 7. The shaft 17 extends across the machine and is provided with a belt pulley 19 for rotating it.

The frame 7 and the saws are raised and lowered by a lever 24 pivoted by a pin 25 to a support 23 on the truck, and provided with a locking device 26. Toothed racks 27 are provided on the frame 7, and are engaged by toothed segments 28 mounted on a shaft 29 on the truck. A lever 30 is secured to the shaft 29, and the levers 24 and 30 are pivotally connected by a rod 31. Any other approved mechanism may however be used for rotating the saws, and for moving the frame with the saws up and down, to suit the plants to be cut.

The windrowing devices are mounted on the truck 2 to the rear of the cutting devices, and are bolted to the same rigid truck frame which supports the cutting devices, instead of being bolted to a separate frame which is pivoted to the truck. The vertical guides 8 of the cutting mechanism, and the windrowing devices, are rigidly secured to the same truck or rigid truck frame, so that they are held constantly in the same relative positions, and these devices are arranged at the front end portion of the truck frame which projects in advance of its front ground wheels 3. Two curved guides 32 are secured to the truck, and are arranged one at each side of the machine. These guides are preferably formed of thin sheet metal, and their front end portions 33 are substantially vertical, and are arranged at a sufficient distance apart to straddle the saws and also two rows of standing plants which are indicated by the dotted lines 84. The middle and rear portions of the guides are shaped something like the mold board of a plow. They converge toward the center line of draft of the machine, and are wider apart at their tops than at their lower parts. The truck 2 has a longitudinal opening 34 at its middle part for receiving the cut plants from the guides 32, and horizontal bottom plates 35 are secured to the truck at the bottoms of the guides 32, at each side of the opening 34.

A shaft 36 is journaled in bearings 37 on the truck, and is arranged crosswise thereof between the front end portions 33 of the guides 32 at their lower parts. Spiral conveyers 38 are secured on the end portions of the shaft 36 and are formed right and left hand as shown. A belt pulley 40 is secured on the middle part of the shaft 36, and is connected by a belt 41 to the belt pulley 19 on the shaft 17, the belt being kept taut by a belt tightener 42. The shaft 36 is rotated from a motor 43 preferably arranged at the rear part of the truck. A longitudinal shaft 44 is journaled in bearings 45 on the truck, and is driven from the motor by belt pulleys 46 and a belt 47. The front end portion of the longitudinal shaft 44 is connected with the conveyer shaft 36 by beveled toothed wheels 48. Any other approved driving mechanism may however be provided for connecting the motor with the saws and with the spiral conveyer.

Instead of allowing the cut canes to drop onto the ground through the opening 34 of the truck, it is sometimes desirable to deliver them to a topping and stripping machine, and for this purpose, an endless traveling conveyer 50 of approved construction is provided. The rear end portion of this conveyer is pivoted to bearings 51 on a support 52 on the truck, and is provided with a driving shaft 53. The driving shaft 53 is driven by the motor by wheels 54 and 55 and a driving band or chain 56. The wheel 55 is secured on a shaft 56' which is operatively connected with the motor by any approved intermediate driving mechanism. In Fig. 2 a flexible driving connection 55' is shown which passes over wheels secured on the shafts 56' and 36, and affords a means for driving the shaft 56' from the shaft 36. This conveyer is normally supported in a raised position as shown, by a removable prop 57, and the cut canes ordinarily pass under it and drop on the ground through the opening 34 of the truck. Whenever desired, the prop is removed, and the conveyer 50 is moved pivotally downward and is supported with its lower end portion projecting into the opening 34 so that it may receive the cut canes and raise them to a suitable elevation.

An inner cane catcher 60 is provided, and is secured to the front end portion of the truck. This cane catcher is preferably formed of thin sheet metal, and it comprises two plates or side portions arranged at an angle to each other and diverging rearwardly and outwardly from the center line of draft, and also inclined upwardly and rearwardly. These plates are suitably curved so that they will catch any canes which are bent over inwardly between the two rows of canes.

Outer cane catchers 62 are also secured to the front end portions of the sides of the truck, and each consists of a suitably curved plate which is inclined inwardly and rearwardly so as to catch the canes which are bent over outwardly of the rows of canes. These inner and outer cane catchers straighten up the bent or inclined canes before their lower ends are severed by the saws. The rear end portions of the converging guide channels formed by the inner and outer cane catchers are arranged to one side of the axes of the saws so that the canes will not strike the saw shafts 9. In order to make the canes fall rearwardly when cut down by the saws, spider wheels 64 are preferably provided, and are secured on vertical shafts 65 journaled in bearings 66 on the saw frame and arranged one on each side of the machine adjacent to the saw shafts. The arms of these spider wheels catch the upper parts of the cut canes, and tilt the canes rearwardly against the guides 32. The spider wheels are revolved from the cross shaft 17 by any suitable driving mechanism. In the present instance, a countershaft 66' is journaled in the saw frame, and is rotated from the cross shaft by wheels 67 and 68 and a drive chain 69. The countershaft 66' has worms 70 secured on it which gear into worm wheels 71 secured on the vertical shafts 65 of the spider wheels.

If a smaller machine is desired, same can be constructed with a single saw at one side, to operate on a single row of canes, and provided with cane catchers, windrowing devices, and other parts, as hereinbefore described, and constituting the principal parts of one-half of the machine for cutting down two rows of canes.

What I claim is:

1. In a harvesting and windrowing machine, a rigid truck frame, cutting devices provided with guides which are secured to the truck frame, and a windrowing device also secured to the truck frame and comprising a horizontal bottom plate and a guide plate extending along the bottom plate and having a substantially vertical front end portion and having middle and rear end portions which are curved inwardly and rearwardly toward the center line of draft and which are also curved downwardly and inwardly from top to bottom.

2. In a harvesting and windrowing machine, a portable truck frame, guides secured to the truck frame, revoluble cutting devices adjustable vertically in the said guides, a windrowing device secured to the said truck frame and maintained by it in a fixed position with respect to the said guides, steering devices for the truck frame arranged at its front end portion and to the rear of the said windrowing device, draft attachments for the truck frame connected to its rear end portion and arranged to the rear of the steering devices, and a motor mounted on the said truck frame and operatively connected with the cutting devices.

3. In a harvesting and windrowing machine, a rigid truck frame, cutting devices provided with guides which are secured to the truck frame, inclined plant catchers also secured to the truck frame and forming a converging guide channel having its rear end arranged to one side of the axis of the cutting devices, and a windrowing device also secured to the truck frame and maintained by it in a relatively fixed position with relation to the cutting devices.

4. In a harvesting and windrowing machine, a rigid truck frame, cutting devices provided with guides which are secured to the truck frame, inclined plant catchers also secured to the truck frame and forming a converging guide channel having its rear end arranged to one side of the axis of the cutting devices, a revoluble spider wheel arranged above the cutting devices and operating to engage with the upper end portions of the plants as they emerge from the said guide channel and tilt them rearwardly, and a windrowing device also secured to the truck frame and maintained by it in a relatively fixed position with relation to the cutting devices.

5. In a harvesting and windrowing machine, a rigid truck frame, cutting devices provided with guides which are secured to the truck frame, inclined plant catchers also secured to the truck frame and forming a converging guide channel having its rear end portion arranged to one side of the axis of the cutting devices, a revoluble spiral conveyer arranged crosswise of the machine to the rear of the cutting devices, a revoluble spider wheel arranged above the cutting devices on a vertical axis and to the rear of the axis of the cutting devices with its arms at its rear side projecting over the said spiral conveyer, and a windrowing device also secured to the truck frame and maintained by it in a relatively fixed position with relation to the cutting devices.

6. In a harvesting and windrowing machine, a rigid truck frame, two rotary cutters arranged at the projecting front end of the truck frame one at each side thereof, guides for the said cutters secured to the truck frame, and a windrowing device also secured to the truck frame and maintained by it in a relatively fixed position with relation to the cutters and their guides, and operating to deposit the cut plants on the center line of draft between the said cutters.

7. In a harvesting and windrowing machine, a rigid truck frame, two rotary cutters arranged at the projecting front end of the truck frame one at each side thereof, guides for the said cutters secured to the truck frame, inner and outer plant catchers secured to the truck frame and forming guide channels the rear end portions of which are arranged upon opposite sides of the axes of the two cutters, and a windrowing device also secured to the truck frame and maintained by it in a relatively fixed position with relation to the cutters and their guides, and operating to deposit the cut plants on the center line of draft between the said cutters.

8. In a harvesting and windrowing machine, a truck, a rotary cutter mounted on a vertical axis at the front end of the truck, plant catchers secured to the truck and forming a converging guide channel having its rear end portion arranged to one side of the axis of the said cutter, a revoluble spider having its axis arranged to the rear of the axis of the said cutter and operating to engage with the upper end portions of the plants as they emerge from the said guide channel and tilt them rearwardly, and a windrowing device supported by the truck and operating to receive the cut plants and deposit them on the center line of draft.

9. In a harvesting and windrowing machine, a truck, cutting devices mounted on the front end portion of the truck, windrowing devices secured on the said truck and provided with means for guiding the cut plants and depositing them longitudinally on the line of draft, steering devices mounted on the front part of the truck, a motor operatively connected with the cutting devices and arranged on the rear part of the truck, and draft attachments arranged to the rear of the windrowing devices and at the respective sides of the truck.

10. In a harvesting and windrowing machine, a truck, vertical guides secured at the front end portion of the truck, a frame slidable on the said guides, cutting devices mounted on the said frame, a driving shaft journaled in the frame and arranged crosswise of the machine and operatively connected with the said cutting devices, a motor arranged at the rear part of the truck, a longitudinal shaft driven by the motor and mounted on the truck, and driving mechanism connecting the longitudinal shaft with the said driving shaft.

11. In a harvesting and windrowing machine, a truck, vertical guides secured on the truck, said guides being arranged parallel to each other and one at each side of the machine, a frame slidable on the said guides and provided with vertical toothed racks, a rock-shaft journaled on the truck and arranged crosswise of it, toothed segments secured on the rock-shaft and gearing into the toothed racks, lever mechanism for operating the rock-shaft, and cutting devices mounted on the said frame.

12. In a harvesting and windrowing machine, a truck, two rotary cutters arranged on the truck one at each side thereof, a windrowing device mounted on the truck and provided with plates which guide the cut plants and deposit them on the center line of draft, and an endless conveyer having its rear end portion pivoted to the rear part of the truck and adapted to be raised and lowered in the space between the guide plates of the windrowing device and to receive the cut plants when secured in its lowered position.

In testimony whereof I have affixed my signature.

HENRY OSBERT SCRANTON.